United States Patent
Tang et al.

(10) Patent No.: US 10,306,111 B2
(45) Date of Patent: May 28, 2019

(54) COLOR TABLE COMPRESSION

(71) Applicants: HEWLETT-PACKARD DEVELOPMENT COMPANY, L.P., Houston, TX (US); PURDUE RESEARCH FOUNDATION, West Lafayette, IN (US)

(72) Inventors: Chuohao Tang, Fremont, CA (US); Sean Michael Collison, Meridian, ID (US); Amy Ruth Reibman, West Lafayette, IN (US); Mark Q. Shaw, Meridian, ID (US); Jan P. Allebach, West Lafayette, IN (US); Jay S. Gondek, Camas, WA (US)

( * ) Notice: Subject to any disclaimer, the term of this patent is extended or adjusted under 35 U.S.C. 154(b) by 0 days.

(21) Appl. No.: 15/986,915

(22) Filed: May 23, 2018

(65) Prior Publication Data
US 2018/0270398 A1    Sep. 20, 2018

Related U.S. Application Data

(63) Continuation of application No. 15/611,462, filed on Jun. 1, 2017, which is a continuation of application No. PCT/US2016/060874, filed on Nov. 7, 2016.

(51) Int. Cl.
*B41J 2/175*    (2006.01)
*H04N 1/60*    (2006.01)
(Continued)

(52) U.S. Cl.
CPC .......... *H04N 1/648* (2013.01); *B41J 2/17546* (2013.01); *H04N 1/41* (2013.01);
(Continued)

(58) Field of Classification Search
CPC ...... H04N 1/648; H04N 1/644; H04N 1/6052; H04N 1/6008; H04N 2201/0087; B41J 2/17546
See application file for complete search history.

(56) References Cited

U.S. PATENT DOCUMENTS 5,644,509 A    7/1997  Schwartz
5,748,176 A    5/1998  Gondek
(Continued)

FOREIGN PATENT DOCUMENTS

CN    103139443 A    6/2013
JP    2003110869 A    4/2003
(Continued)

OTHER PUBLICATIONS

Arnavut, Z et al. Lossless Compression of Color Palette Images with One-dimensional Techniques, Apr.-Jun. 2006, <http://scholarworks.rit.edu/cgi/viewcontent.cgi?article=2049&context=article> (13 pages).
(Continued)

*Primary Examiner* — Christopher Wait
(74) *Attorney, Agent, or Firm* — Trop Pruner & Hu PC

(57) ABSTRACT

In some examples, a print cartridge includes a memory device comprising quantized coefficients derived from a lossy compression, at a selected step size, of a difference color table including a plurality of difference nodes in which each difference node represents a difference value that is a difference of a value of a node of a color table and a value of a corresponding node of a reference table, the quantized coefficients useable to produce a reconstructed difference color table including a first set of difference nodes each representing a difference value that is within an error threshold at the selected step size, and a second set of difference nodes each representing a difference value that is outside an error threshold at the selected step size. The memory device further comprises corrective information to correct the second set of difference nodes of the reconstructed difference color table.

15 Claims, 6 Drawing Sheets

(51) Int. Cl.
  *H04N 1/64* (2006.01)
  *H04N 1/41* (2006.01)
  *H04N 1/00* (2006.01)
(52) U.S. Cl.
  CPC ......... *H04N 1/6008* (2013.01); *H04N 1/6019* (2013.01); *H04N 1/6052* (2013.01); *H04N 1/644* (2013.01); *H04N 1/00538* (2013.01); *H04N 2201/0087* (2013.01)

(56) References Cited

U.S. PATENT DOCUMENTS

| | | | |
|---|---|---|---|
| 5,751,434 | A | 5/1998 | Narendranath et al. |
| 5,930,553 | A | 7/1999 | Hirst et al. |
| 5,982,990 | A | 11/1999 | Gondek |
| 6,313,925 | B1 | 11/2001 | Decker et al. |
| 6,327,383 | B2 | 12/2001 | Todoroki |
| 6,804,025 | B1 | 10/2004 | Ueda et al. |
| 6,816,179 | B2 | 11/2004 | Hanyu |
| 7,221,473 | B2 | 5/2007 | Jeran |
| 7,259,890 | B2 | 8/2007 | Jeran |
| 7,633,658 | B2 | 12/2009 | Tsuji |
| 7,663,781 | B2 | 2/2010 | Song et al. |
| 7,796,296 | B2 | 9/2010 | Martinez et al. |
| 7,826,111 | B2 | 11/2010 | Won et al. |
| 8,203,758 | B2 | 6/2012 | Itagaki |
| 8,274,696 | B2 | 9/2012 | Yoneda |
| 8,526,062 | B2 | 9/2013 | Klassen |
| 8,740,343 | B2 | 6/2014 | Kawai |
| 8,797,616 | B2 | 8/2014 | Sugiura et al. |
| 8,885,216 | B2 | 11/2014 | Ishitoya et al. |
| 9,111,204 | B2 | 8/2015 | Fujita et al. |
| 9,621,764 | B2 | 4/2017 | Gondek |
| 9,992,382 | B2 | 6/2018 | Hu et al. |
| 2002/0126301 | A1* | 9/2002 | Bowers ............... B41J 2/17546 358/1.9 |
| 2002/0149785 | A1 | 10/2002 | Chu et al. |
| 2003/0025939 | A1 | 2/2003 | Jeran |
| 2005/0073731 | A1 | 4/2005 | Deer et al. |
| 2007/0081205 | A1 | 4/2007 | Tai et al. |
| 2007/0115506 | A1 | 5/2007 | Yada |
| 2007/0195342 | A1 | 8/2007 | Sugiura et al. |
| 2007/0291287 | A1 | 12/2007 | Snyder et al. |
| 2010/0085605 | A1 | 4/2010 | Shaw et al. |
| 2010/0157331 | A1 | 6/2010 | Shestak |
| 2010/0220926 | A1 | 9/2010 | Monga et al. |
| 2010/0296114 | A1 | 11/2010 | Jung et al. |
| 2014/0098387 | A1 | 4/2014 | Chang |
| 2015/0103902 | A1 | 4/2015 | Li et al. |
| 2016/0112606 | A1 | 4/2016 | Gondek et al. |

FOREIGN PATENT DOCUMENTS

| | | |
|---|---|---|
| TW | 201505861 A | 2/2015 |
| WO | WO-2006081253 | 8/2006 |
| WO | WO-2015016860 | 2/2015 |
| WO | WO-2015042432 | 3/2015 |
| WO | WO-2016028272 | 2/2016 |
| WO | WO-2016186625 | 11/2016 |

OTHER PUBLICATIONS

Balaji et al., Hierarchical Compression of Color Look Up Tables, 15th Color imaging Conference Final Program and Proceedings, 2008 (6 pages).
Balaji et al., Preprocessing Methods for Improved Lossless Compression of Color Look-up Tables, Journal of Imaging Science and Technology, 2008 (9 pages).
Boon-Lock Yeo and Bede Liu, Volume rendering of DCT-based compressed 3D scalar data, IEEE Transaction on Visualization and Computer Graphics, 1(1):29-43, Mar. 1995 (15 pages).
Canon Imagepress Server Color Management Guide, 2009, <http://www.techsupport.cusa.canon.com/pf/MHPContent/imagepress/iPress-Server-Color-Guide.pdf > (31 pages).
De Queiroz et al., On Independent Color Space Transformations for the Compression of CMYK Images; IEEE Transactions on Image Processing, vol. 8, No. 10, Oct. 1999 (6 pages).
Deutsch, Network Working Group, Request for Comments: 1952, Category: Informational, GZIP file format specification version 4.3, May 1996 (19 pages).
European Patent Office, International Search Report and Written Opinion for PCT/US2016/041633 dated Mar. 20, 2017 (19 pages).
European Patent Office, International Search Report and Written Opinion for PCT/US2016/060873 dated Mar. 20, 2017 (16 pages).
European Patent Office, International Search Report and Written Opinion for PCT/US2016/060874 dated Mar. 14, 2017 (16 pages).
European Patent Office, International Search Report and Written Opinion for PCT/US2016/060875 dated Mar. 14, 2017 (18 pages).
European Patent Office, International Search Report and Written Opinion for PCT/US2016/060876 dated Mar. 9, 2017 (14 pages).
European Patent Office, International Search Report and Written Opinion for PCT/US2016/060877 dated Mar. 10, 2017 (17 pages).
European Patent Office, Written Opinion of the International Preliminary Examining Authority for PCT/US2013/062862 dated Jul. 3, 2015 (7 pages).
Hewlett-Packard Development Company L.P., International Application No. PCT/US2016/060875 entitled Printing Device Supply Component filed Nov. 7, 2016 (42 pages).
Hewlett-Packard Development Company L.P., International Application No. PCT/US2016/060876 entitled Printing Device Supply Component filed Nov. 7, 2016 (38 pages).
Hewlett-Packard Development Company, L.P., International Appl. No. PCT/US2016/041633 entitled Color Table Compression filed Jul. 8, 2016 (29 pages).
ICC Profiles dated on or before Jun. 26, 2016 (2 pages).
International Color Consortium, Specification, ICC.1:2010 (Profile version 4.3.0.0) Image technology colour management—Architecture, profile format, and data structure [Revision of ICC. 1:2004-10], 2010 (130 pages).
Kim, Low Bit-Rate, Scalable Video Coding with 3D Set Partitioning in Hierarchical Trees (3D SPIHT), date unknown (34 pages).
Lexmark.com—Color Quality Guide, Oct. 17, 2007, <http://publications.lexmark.com/publications/pdfs/2007/cx310/cx310_hmp/en/color-quality-guide.pdf > (5 pages).
Lou—Abstract Only—The development of the CIE 2000 colour-difference formula: CIEDE2000, Aug. 2001 (4 pages).
Luo et al., Uniform Colour Spaces Based on CIECAM02 Colour Appearance Model, 2006 (11 pages).
LZMA-SDK (Software Development Kit) dated on or before Jan. 7, 2009 (2 pages).
Mark Q. Shaw et al., U.S. Appl. No, 15/702,138 entitled Printing Device Supply Component filed Sep. 12, 2017 (42 pages).
Monga, V. et al, "Design and Optimization of Color Lookup Tables on a Simplex Topology", Apr. 2012, pp, 1981-1996.
Robertson, Color Research & Application—Abstract Only, 1977 (4 pages).
Said, A New Fast and Efficient Image Codec Based on Set Partitioning in Hierarchical Trees, IEEE, May 1993 (16 pages).
Shapiro, Embeeded Image Coding Using Zerotrees of Wavelet Coefficients, IEEE, Dec. 1993 (18 pages).
Sudhakar, Image Compression using Coding of Wavelet Coefficients—A Survey, Jun. 2005 (14 pages).
Tang; ICC Profile Color Table Compression, Nov. 7, 2016 (6 pages).
Tang, Three-Dimensional Wavelet-Based Compression of Hyperspectral Images, 2006 (36 pages).
U.S. Appl. No. 15/642,929, Non-Final Rejection dated Sep. 1, 2017 (5 pages).
Watson, Image Compression Using the Discrete Cosine Transform, 1994 (17 pages).
Zhenhua Hu et al., U.S. Appl. No. 15/642,929 entitled Color Table Compression filed Jul. 6, 2017 (29 pages).
U.S. Appl. No. 15/970,338, Notice of Allowance dated Aug. 31, 2018, pp. 1-3 and attachments.

* cited by examiner

COLOR TABLE COMPRESSION

CROSS REFERENCE TO RELATED APPLICATIONS

This is a continuation of U.S. application Ser. No. 15/611,462, filed Jun. 1, 2017, which is a continuation of International Application No. PCT/US2016/060874, filed Nov. 7, 2016, which claims priority from International Application No. PCT/US2016/041633, filed Jul. 8, 2016, which are all hereby incorporated by reference in their entirety.

BACKGROUND

Color management systems deliver a controlled conversion between color representations of various devices, such as image scanner, digital camera, computer monitors, printers, and corresponding media. Device profiles provide color management systems with information to convert color data between color spaces such as between native device color spaces and device-independent color spaces, between device-independent color spaces and native device color spaces, and between source device color spaces and directly to target device color spaces.

DETAILED DESCRIPTION

Figure 1:
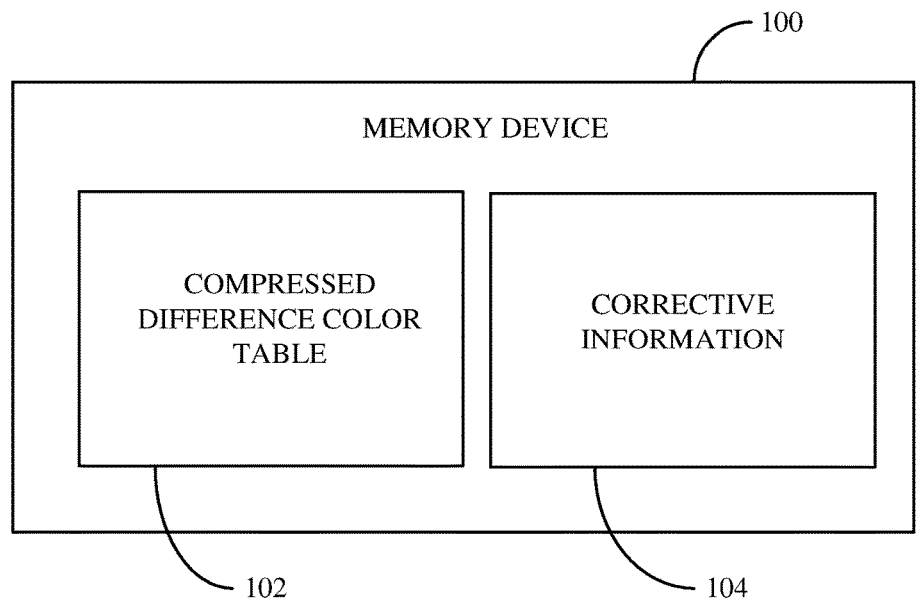
FIG. 1 is a block diagram illustrating an example memory device having a compressed color table.

In the following detailed description, reference is made to the accompanying drawings, which form a part hereof, and in which are shown by way of illustration as specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

A color space is a system having axes and that describes color numerically. Some output devices, such as printing devices, may employ a type of cyan-magenta-yellow-key (black) (CMYK) color space, while some software applications and display devices may employ a type of red-green-blue (RGB) color space. For example, a color represented in the CMYK color space has a cyan value, a magenta value, a yellow value, and a key value that combined numerically represent the color.

A color profile is a set of data that characterizes a color space. In one example, a color profile can describe the color attributes of a particular device or viewing specifications with a mapping between the device-dependent color space, such as a source or target color space, and a device-independent color space, such as profile connection space (PCS), and vice versa. The mappings may be specified using tables such as look up tables, to which interpolation is applied, or through a series of parameters for transformations. Devices and software programs—including printing devices, monitors, televisions, operating systems, browsers, and other device and software—that capture or display color can include profiles that comprise various combinations of hardware and programming. An ICC profile is an example color profile that is a set of data that characterizes a color space according to standards promulgated by the International Color Consortium (ICC). Examples of this disclosure using ICC profiles, however, are for illustration only, and the description is applicable to other types of color profiles or color spaces.

The ICC profile framework has been used as a standard to communicate and interchange between various color spaces. An ICC output profile includes color table pairs, so-called A2B and B2A color look up tables, where A and B denote the device-dependent and the device-independent color spaces, respectively. For different devices, there are different look up table rendering intent pairs. For example, an ICC profile allows for three color table pairs, enumerated from 0 to 2, enabling the user to choose from one of the three possible rendering intents: perceptual, colorimetric, or saturation. ICC profiles are often embedded in color documents as various combinations of hardware and programming to achieve color fidelity between different devices, which increases the total size of these documents. The size of color tables will also increase with finer sampling of the spaces and larger bit depths.

Color tables that provide transformations between various color spaces are extensively used in color management, common examples being the transformations from device independent color spaces (such as CIELAB, i.e., $L^*a^*b^*$) to device dependent color spaces (such as RGB or CMYK) and vice versa. The mappings may be specified using tables such as one or more single dimensional or multidimensional look-up tables, to which interpolation can be applied, or through a series of parameters for transformations. A color table can include an array or other data structure on a memory device that replaces runtime computations with a simpler array indexing operation as a color look-up table. For the purposes of this disclosure, color tables can also include monochromatic and gray scale color tables.

Printing devices—including printers, copiers, fax machines, multifunction devices including additional scanning, copying, and finishing functions, all-in-one devices, or other devices such as pad printers to print images on three dimensional objects and three-dimensional printers (additive manufacturing devices)—employ color management systems to deliver a controlled conversion between color representations of various devices, such as image scanner, digital camera, computer monitors, printers, and software applications. In one example, printing devices often employ color tables including multidimensional color look-up tables to provide transformations between different color spaces such as from input device-independent colors to CMYK ink amounts for printing on media. For devices such as color printers or other printing devices, the color tables are often embedded in memory devices storing the printer firmware or other hardware, where the color tables consume computer memory in storage devices. The trend toward finer sampling of the spaces and larger bit depths also results in an increase in table sizes, further exacerbating concerns related to costs of and available space on the computer memory. Additionally, the concerns of efficient memory use and storage space consumption are applicable for color tables that are embedded in color documents such as ICC source profiles. In applications where embedded profiles are used, the embedded profiles represent an overhead.

FIG. 1 illustrates an example memory device 100 including a compressed difference color table 102 and corrective information 104. A difference color table that is to be compressed includes a plurality of difference nodes in which each difference node represents a value that is a difference of a value of a node an original color table and a value of corresponding node of a reference table. The difference color table is compressed at a selected compression amount, such as a compression ratio. The plurality of difference nodes includes a set of nodes having a color difference outside an error threshold at the selected compression ratio. The corrective information corresponds with the set of nodes of the color table.

In one example, the memory device may be for a supply component. For example, the memory device may be for a print cartridge for a printing device. In some examples, the memory device may be included on a supply component for a printing device. In some examples, a reference table, for use with reconstruction of a color table corresponding with the difference color table, may be included on a separate memory device located on the printing device. The color table can include a multidimensional color look-up table to provide transformations between different color spaces such as from input device-independent colors to CMYK ink amounts. As this color transform may be ink-dependent, such as dependent on the particular formulation of the ink included in a supply component of a print cartridge including ink, the compressed difference table can be stored on a memory device located on the print cartridge for use with the printing device having the reference table.

As used herein, a printing device supply component may corresponding to a component from which consumable printing material may be supplied to a printing device for use thereof. Some examples of a printing device supply component may be referred to as a print cartridge, where a print cartridge may be replaceable and may be a two dimensional or three dimensional print cartridge. Examples of printing device supply components and print cartridges may comprise a print material reservoir to store a reserve of print material for use in printing operations when replaceably coupled to a printing device/system. Examples of print material, as used herein, may include consumable materials such as consumable fluids and/or consumable powders. Examples of print material include ink, toner, gloss, varnish, powders, sealants, colorants, and/or other such materials for printing. For example, a print cartridge may include fluid ink corresponding to at least one color (or two or more colors) in which a printing device may print. In other examples, a print cartridge may include toner corresponding to at least one color (or two or more colors) in which a printing device may print. In some examples, such supply components and print cartridges thereof may be referred to as "replaceable supplies."

The example memory device 100 can be implemented to include a combination of one or more volatile or nonvolatile computer storage media. Computer storage media may be implemented as any suitable method or technology for storage of information such as computer readable instructions, data structures, program modules or other data. A propagating signal by itself does not qualify as storage media or a memory device. The memory device can be included as part of a system including a processor and memory for storing a set of computer instruction for controlling the processor to perform a color transformation.

Figure 2:
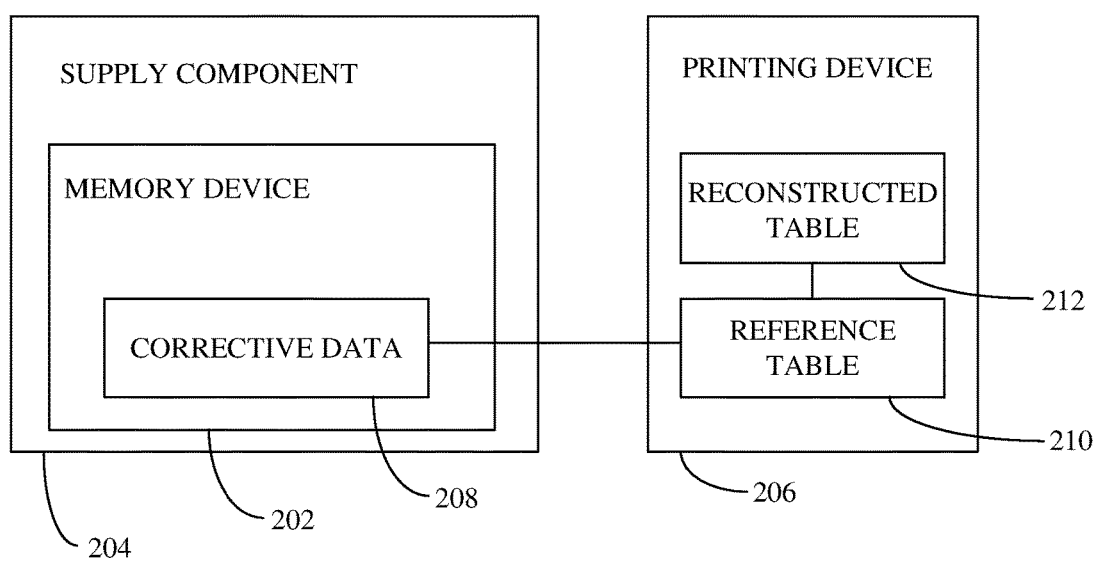
FIG. 2 is a block diagram illustrating an example system implementing the compressed color table on the memory device of FIG. 1.

FIG. 2 illustrates an example system 200 employing the memory device 100. System 200 includes a memory device 202, which can correspond with memory device 100, for a supply component 204 that can be used with a printing device 206. An example of a printing device supply component 204 is a consumable, or a replaceable element on the printing device 206, such as an ink cartridge, a fuser, a photoreceptor, a toner cartridge, or other element. The memory device 202 includes corrective data 208 corresponding with nodes of a reference table 210 for the printing device 206. In one example, the reference table 210 is stored on a memory device on the printing device 206 that is a separate hardware component from memory device 202. The reference table 210 can be stored with the firmware of the printing device 206. The corrective data 208 includes the compressed difference color table 102 and corrective information 104 of memory device 100 to transform the nodes of the reference table 210 to a reconstructed color table 212 to provide transformations between different color spaces such as from input device-independent colors to printing-device dependent colors. In one example, the compressed difference color table 102 is reconstructed and combined with the reference table 210 to generate an initially reconstructed color table. The corrective information 104 is then applied to the initially reconstructed color table to generate a reconstructed color table.

Figure 3:
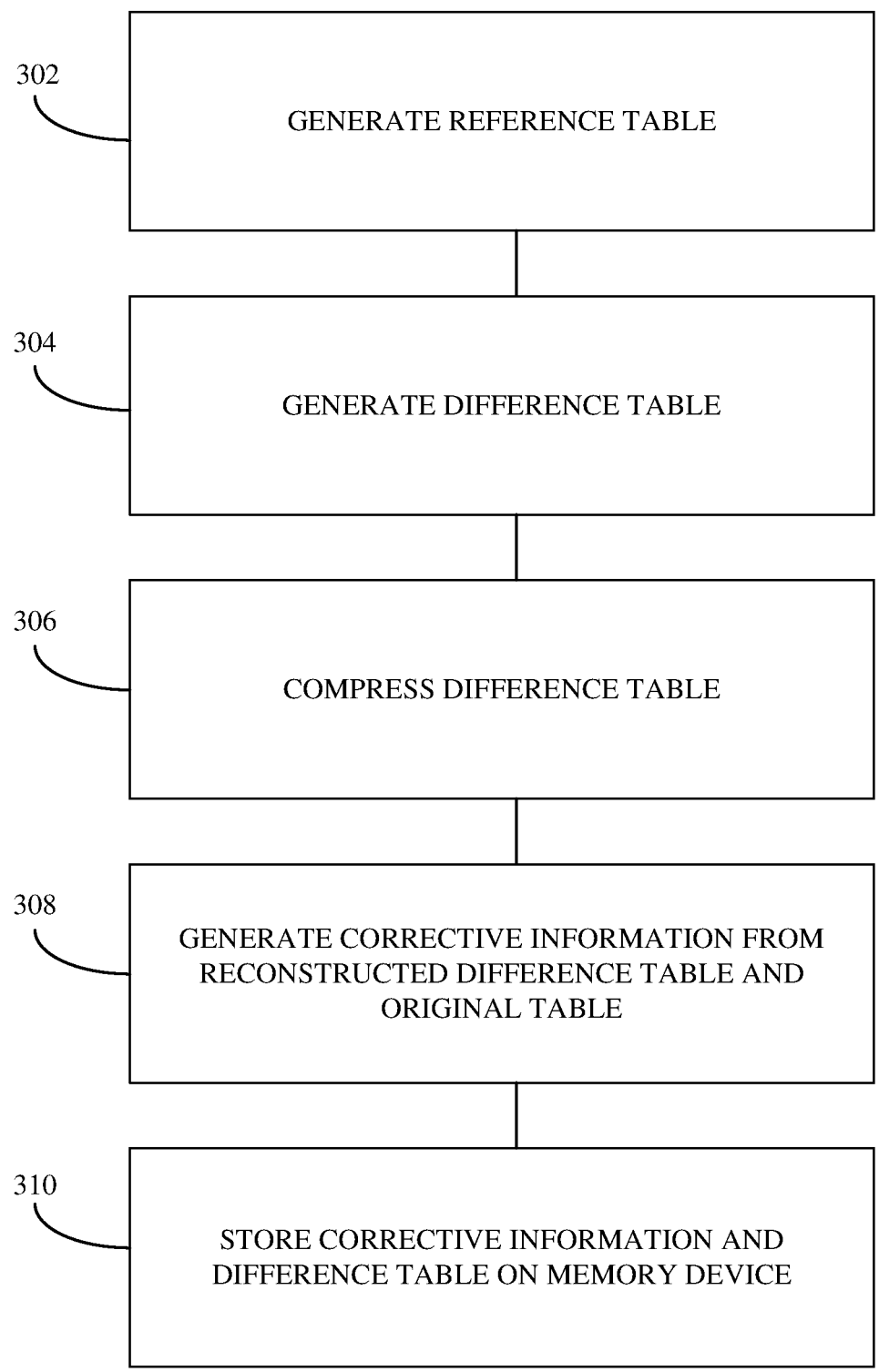
FIG. 3 is a block diagram illustrating an example method of generating the compressed color table of FIG. 1.

FIG. 3 illustrates an example method 300 of generating the corrective data 208 on memory device 202, which can include the compressed difference table 102 and corrective information 104 of memory device 100. The method 300 allows the storing one or more color look-up tables (CLUTs) in environments where a memory device, such as flash memory on printer cartridges, is relatively expensive and limited. The method 300 supports lossy compression for relatively high compression ratios to meet storage space limitations and achieves relatively small color differences.

In one example, a color table environment such as a printing device may include a plurality of multidimensional color tables that correspond with different media and neutral axes of a color gamut included in a color profile. In general, a profile can include N color tables to be processed, such as $CLUT_1$, $CLUT_2$, ..., $CLUT_N$, and the input color space includes $J_{in}$ channels. In one example, multiple color tables representing different rendering intents can be included with one ICC profile. Additionally, the output color space includes $J_{out}$ channels, and in many examples of an ICC profile $J_{in}$ and $J_{out}$ can be 3 or 4 channels. For each output channel, the corresponding lookup table contains $M^{J_{in}}$ nodes. For example, each color table can include $M^3$ nodes for each of the C, M, Y, and K four colorants corresponding with each ink color used in the printing device. Additionally, each type of media used in the printing device can include a set of color tables.

In the example method, a reference table $CLUT_{ref}$ is generated at 302. The reference table includes nodes having a preselected, or predetermined values. In one example, the reference table is generated from averaging the N color tables of the profile. Each of the N original color tables is subtracted from the reference table to obtain a corresponding difference color table $difCLUT_i$ at 304. For example, $difCLUT_i = CLUT_i - CLUT_{ref}$, i=1, 2, ..., N. The N difference color tables are compressed, such as with a lossy compression, at 306. The compressed difference table is reconstructed and applied to the corresponding original difference color table to generate corrective information at 308. The compressed difference table and the corrective information are stored on a memory device at 310, such as on memory device 202 on supply component 204. The reference table can be stored on the printing device 206 where memory space can be more plentiful and contribute less to the overhead than on a supply component 204. In some examples, one or more of the compressed difference table, corrective information, and the reference table can be further compressed with a lossless compression.

The reference table $CLUT_{ref}$ in one example can be generated at 302 from averaging the N original color tables, or a subset of the original color tables such as related or logically grouped color tables, from the profile. For example, $$CLUT_{ref} = \frac{\sum_{i=1}^{N} CLUT_i}{N}$$

Each of the original color tables includes a plurality of nodes in which each node is at a location and includes a value. In one example, each of the multidimensional original color tables used to create the reference table can include $M^3$ nodes. The values of each node at node location j of each of the original color tables are added together and then divided by the number of values to provide a value at the corresponding node in the reference table. Thus, the values at node location j of the original color tables are added together, divided by the number of color tables N to provide the value at node location j of the reference color table, in which j is the node location from 1 to $M^3$.

The difference color table generated at 304 can include a plurality of difference nodes in which each node includes a value that represents a difference of a value of a node of the original color table and a value of a node of a reference table. In one example, the original color table and reference table each include $M^3$ nodes. The value of each node of the original color table is subtracted from the value of the corresponding node in the reference table to provide a value at the corresponding node in the difference table. Thus, the value at node location j of the original color table is subtracted from the value at node location j of the reference table to provide the value at node location j of the difference color table, in which j is the node location from 1 to $M^3$.

In one example of compressing a difference color table at 306, the nodes of the difference color table color table are transformed and processed to obtain quantized coefficients. The particular transformation and processing can be determined by a selected amount of compression, such as compression ratio, desired and can include a selected step size Δ. The quantized coefficients can be reordered into a one-dimensional bitstream using a multi-dimensional reordering, such as a three-dimensional zigzag ordering. The bitstream of quantized coefficients can be provided as a binary file and further compressed with a lossless compression. The resulting compressed bitstream can be stored as a file on the memory device 100 included in compressed difference color table 102 at 310.

In the example of compressing the difference table at 306, a coefficient bit assignment table is calculated from the quantized coefficients. The coefficient bit assignment table can be applied to the quantized coefficients to reconstruct the coefficients in decompression. The three-dimensional zigzag ordering can introduce a large amount of redundancy to the coefficient bit assignment table, and the coefficient bit assignment table can be further compressed with the lossless compression. The compressed coefficient bit assignment table can be included as part of the compressed difference color table 102 at 310 or stored separately with the firmware on printing device 206.

Many color devices can employ multiple coefficient bit assignment tables. For example, a coefficient bit assignment table can be created for each colorant. For a printing device using C, M, Y, K colorants, four separate coefficient bit assignment tables can be used. Additional parameters may dictate eight coefficient bit assignment tables can be used in a printing device, each coefficient bit assignment table corresponding with a different set of quantized coefficients of a compressed original color table.

Lossless compression and lossy compression are forms of data compression, which includes encoding information using fewer bits than the original representation. In lossless compression, no digital difference exists between the original data and the reconstructed compressed data. In lossy compression, a portion of the original data is lost upon reconstruction of the compressed data.

A variety of lossy and lossless compression systems can be employed in method 300. In one example, the lossy compression applied at 306 can be implemented using a discrete cosine transform, or DCT, which expresses a finite sequence of data points in terms of a sum of cosine functions oscillating at different frequencies, although other systems can be employed. DCT compression can be particularly apt for examples in which color tables may be expressed in multiple dimensions. For example, an ICC profile may include a three-dimensional or a four-dimensional color table, and the lossy compression can be performed using a three-dimensional or four-dimensional DCT process, accordingly. Another lossy compression system could be based on wavelets, such as the SPIHT (Set Partitioning In Hierarchical Trees) and SPECK (Set Partitioned Embedded bloCK). Lossless compression can be implemented using a variety of lossless systems including Lempel-Ziv-Markov chain Algorithm process (or LZMA), GZIP (or GNU-zip) process, or other suitable lossless systems.

In order to determine the corrective information at 308, the compressed difference color table is reconstructed to generate an initially reconstructed difference color table. In one example, the reconstructed difference table and reference table each include $M^3$ nodes, and the value of each node of the reconstructed difference table is added to the value at the corresponding node in the reference table to provide a value at the corresponding node in the initially reconstructed table. The values of the nodes of initially reconstructed table are compared to the corresponding nodes in the corresponding original difference color table. Due to the lossy compression at a selected amount of compression, the values of the nodes of the initially reconstructed difference color table may differ from the values of the corresponding node in the original difference color table. The amount of difference between the values of initially reconstructed difference color table and the original difference color table can be referred to as an error, and may change for different amounts of compression.

An error threshold, such as a selected value, is defined for a difference between values in the nodes of the initially reconstructed difference color table and the values in the corresponding nodes of the original difference color table. For the set of nodes of the initially reconstructed difference color table having values outside the defined error threshold, corrective information is generated.

For example, corrective information generated at 308 can include a residual value to be added to each node of the initially reconstructed difference table having a value outside the scope of the defined error threshold to bring the value of that node within the error threshold, such as equal to the value of the corresponding node in the original difference color table, or within a more stringent error threshold, as well as the node location j corresponding with the residual value. In one instance, such as for nodes on or proximate the neutral axis, the residual values correct generally all error. In another instance, such as for nodes in the red or dark blue color space, the residual values correct error to be at or about the error threshold.

The nodes of the difference table, when compressed and reconstructed, can include a set of nodes that include a color difference falling outside of the error selected threshold at a selected amount of compression. Corrective information for the set of nodes can include a set of residual values to bring the nodes of the reconstructed difference color table equal to or within the error threshold or within a more stringent error threshold. Corrective information can also include the node locations corresponding with the residual values. In some examples, the corrective information is compressed with a lossless compression. Upon combination of the reconstructed difference color table and the reference color table, such as in printing device 206, the corrective information can be applied such as by adding the residual values to the nodes at the respective locations to obtain a reconstructed color table having all nodes within the error threshold.

In another example, the initially reconstructed difference table is combined with the reference table and subtracted from the original color table to determine which nodes are outside of the selected error threshold.

The example method 300 can be implemented to include a combination of one or more hardware devices and programs for controlling a system, such as a computing device having a processor and memory, to perform method 300 to compress a color table into a file or a bitstream. For example, method 300 can be implemented as a set of executable instructions stored in a computer memory device for controlling the processor to perform method 300. Other methods of the disclosure can be implemented as a combination of hardware and programming for controlling a system as well. A color table can include an array or other data structure on a memory device that replaces runtime computations with a simpler array indexing operation as a color look up table.

Figure 4:
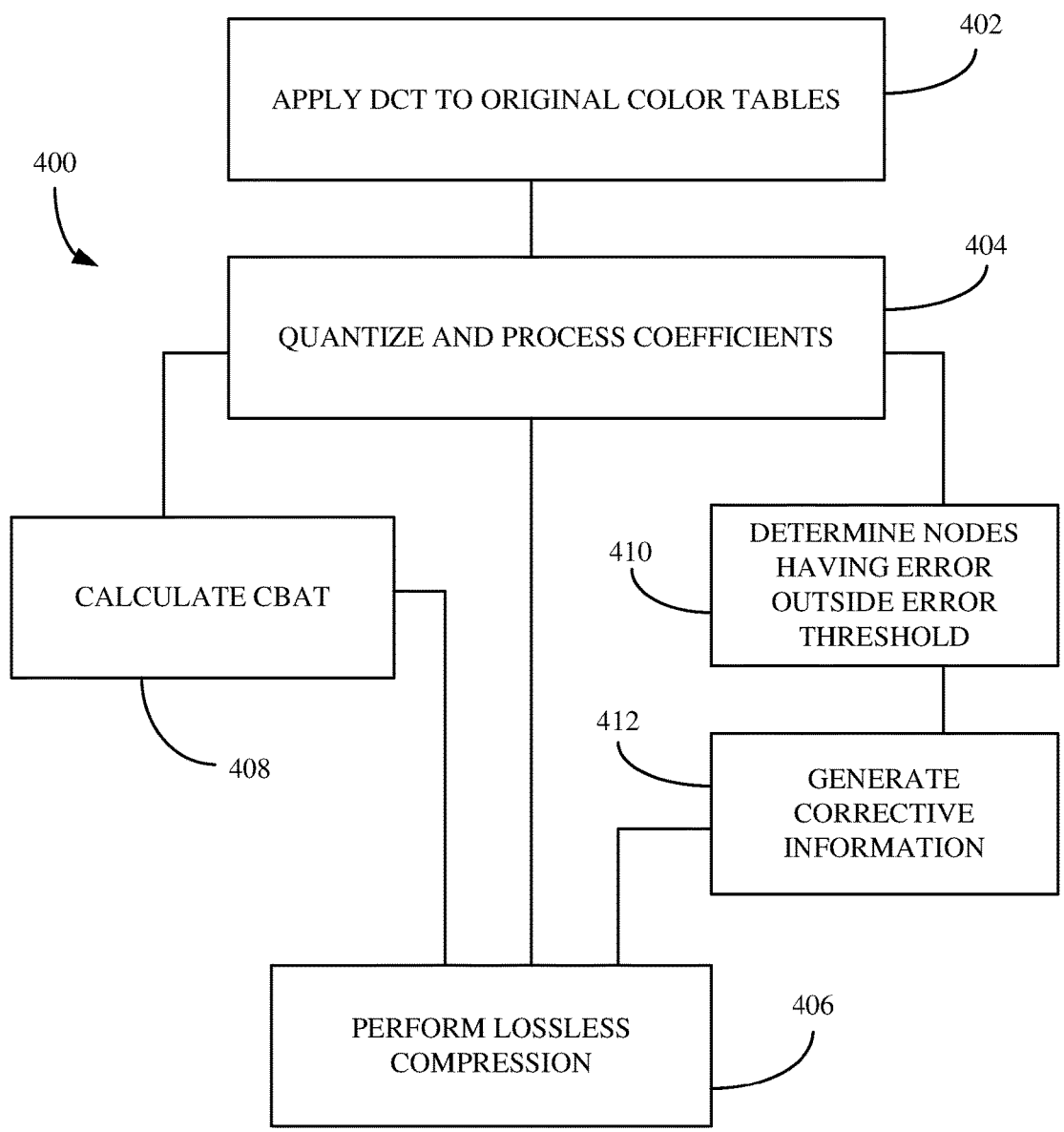
FIG. 4 is a block diagram illustrating an example method of compressing the color table incorporating features of the example method of FIG. 3.

FIG. 4 illustrates an example method 400 of generating a compressed difference tables, such as compressed difference table 102. Method 400 includes applying a DCT process, such as a multidimensional DCT process, to the difference color tables at 402. Particularly, a $J_{in}$-dimensional DCT process can be applied to the difference color tables at 402. In general, a profile can include N difference color tables to be processed, such as $difCLUT_1$, $difCLUT_2$, . . . , $difCLUT_N$, and the input color space includes $J_{in}$ channels. Additionally, the output color space includes $J_{out}$ channels, and in many examples of an ICC profile $J_{in}$ and $J_{out}$ can be 3 or 4 channels. For each output channel, the corresponding lookup table contains $M^{J_{in}}$ nodes. Applying the $J_{in}$-dimensional DCT transform to the difference color tables difCLUT$_i$, at 402 provides for DCT coefficients, which in the example includes as many coefficients as there are nodes in the difference color table and thus the corresponding original color table.

The DCT process at 402 yields AC coefficients and DC coefficients that are quantized and processed at 404. Informally, a coefficient that scales the constant basis function is referred to as the DC coefficient, while the other coefficients are referred to as AC coefficients. The AC coefficients are quantized using a fixed step size $\Delta$, and rounded to the nearest integer in an example at 404. Additionally, the DC coefficients are also rounded to the nearest integer at 404, so they are effectively quantized to step size $\Delta=1$. Quantization yields $J_{in}$-dimensional quantized coefficients.

In further processing at 404, the $J_{in}$-dimensional quantized coefficients are reordered into a one-dimensional data stream of a selected order. The selected order can be based upon a multidimensional zigzag ordering, such as a three-dimensional zigzag ordering, which can be used to reorder the quantized coefficients because the energy after the DCT transform is concentrated in the low frequency domain. In performing a three-dimensional ordering, traversals can be configured such that the planes i+j+k=c are visited in increasing order of c and a two-dimensional zigzagging is performed within each plane. Such traversals of the quantized coefficients from low-to-high frequency can introduce a large amount of redundancy to the coefficient bit assignment table, which can provide efficient packing of the data in compression. The resulting one-dimensional data stream of quantized coefficients can be written to a binary file.

The one-dimensional data stream of quantized coefficients in the binary file can be compressed with a lossless compression, such as LZMA described above or another lossless compression at 406 to create the compressed quantized coefficients.

The quantized coefficients are applied to calculate a coefficient bit assignment table at 408, which can be used for decoding the compressed difference color table. The coefficient bit assignment table stores the information related to how many bits are assigned to each coefficient. For example, $\lceil \log_2 L \rceil$ bits are used to quantize a real number in the range −0.5 to L−0.5 to an integer value, in which $\lceil \log_2(L) \rceil$ represents a ceiling function of $\log_2(L)$ and a ceiling function maps the real number to the smallest subsequent integer. An additional bit is provided to the sign because the coefficient can be a negative number. Each output channel can correspond to a separate coefficient bit assignment table. Accordingly, a profile having $J_{out}$ output channels will include $J_{out}$ coefficient bit assignment tables. The nodes in each coefficient bit assignment table correspond with the nodes of the difference color table.

An example process can be applied to calculate a coefficient bit assignment table for each of the $J_{out}$ output channels at 408. For a given output channel, the quantized DCT coefficient of the output channel is denoted as $Q_{i,j}$, in which i (from 1 to N) is the color table number and j (from 1 to $M^{J_{in}}$) is the node number. The number of bits $B_{i,j}$ needed for $Q_{i,j}$ is $B_{i,j}=0$ if $Q_{i,j}$ is 0 and $B_{i,j}=\lceil \log_2|Q_{i,j}|\rceil+1$ if $Q_{i,j}$ is not 0.

In one example, a fixed number of bits a can be assigned to every node of the coefficient bit assignment table and used to determine the size of each coefficient bit assignment table. The value of the coefficient bit assignment table at node location j, or $L_j$, can be determined from the largest number of bits $B_{i,j}$ needed for each i (from 1 to N) difference color table. The fixed number of bits a can be determined from the largest number of $\lceil \log_2 (L_j) \rceil$ as determined for each j (from 1 to $M^{J_{in}}$). In the example, the total size of one coefficient bit assignment table for an output channel is thus $aM^{J_{in}}$ bits. The above process can be repeated to determine the size for each output channel, and the total size is the sum of the sizes for the $J_{out}$ coefficient bit assignment tables.

The $J_{out}$ coefficient bit assignment tables are compressed such as with a lossless compression at 406 to create the compressed coefficient bit assignment table. The total size of the coefficient bit assignment table can be significantly reduced via the lossless compression.

The selected step size Δ in 404 affects the compression, and a larger step size Δ achieves a larger amount of compression. The selected step size Δ in 404, however, also affects the amount of error between the values of the node in the difference color table and the values of the nodes of the reconstructed compressed difference color table, and a larger step size Δ creates a larger amount of error. For some reconstructed compressed values, the amount of error may be acceptable, such as generally imperceptible, for an application. In such cases, the color difference or amount of error is within a selected error threshold. In other cases, such as for colors around the neutral axis, an amount of error may be too perceptible for the application. In such cases, the amount of error is outside the scope of the selected error threshold. In one example, an amount of error outside the selected error threshold is an amount of error greater than the selected error threshold.

In order to achieve a high enough step size to provide benefits of lossy compression, one or more nodes may include an amount of error outside the scope of the selected error threshold. Nodes including an amount of error outside the scope of the selected error threshold are determined at 410. For such nodes, corrective information to modify the nodes is generated at 412.

Figure 5:
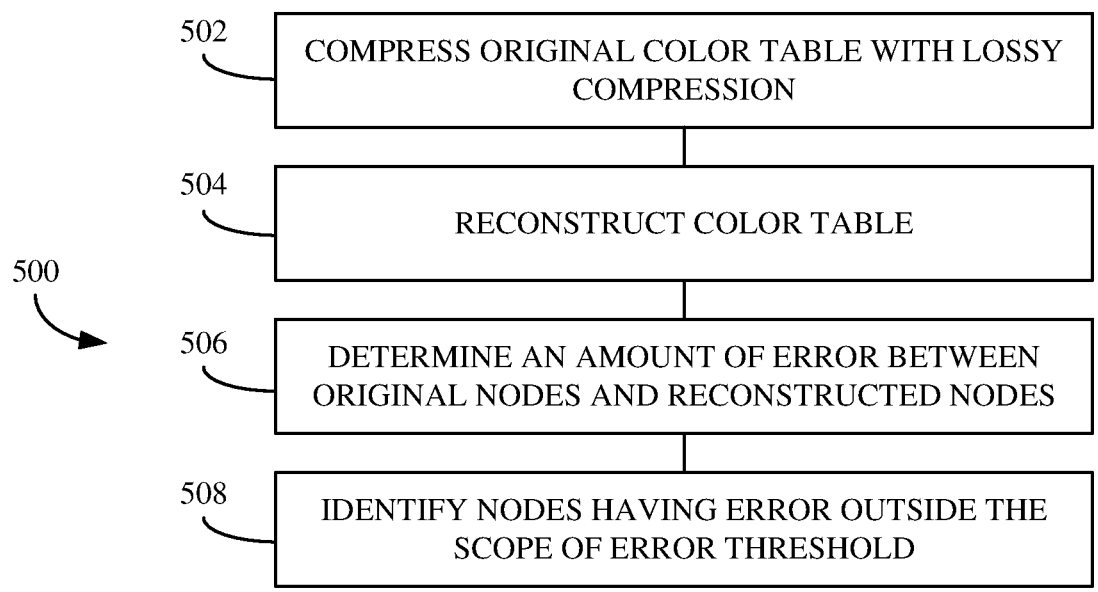
FIG. 5 is a block diagram illustrating an example method having additional features of the example method of FIG. 3.

FIG. 5 illustrates a method 500 that can be implemented in determining the nodes of the original color table to be modified with corrective information. In one example, the method 500 is performed using a selected step size and a selected error threshold. The original difference color table is compressed using a lossy compression technique such as DCT in 402, 404, 408 of method 400 at 502. The compressed difference color table is reconstructed via decoding to invert the compression and yield a reconstructed color table at 504. The nodes of the reconstructed difference color table are compared to the original difference color table to determine an amount of error at 506. The amount of error for a node, in one example, is the difference between the value associated with the node in the original difference color table and the value associated with the node of the reconstructed difference color table. In one example of 506, each node of the reconstructed difference color table is compared to its corresponding node in the original difference color table to determine an amount of error for that node.

In one example, the processes of 402, 404, and 408 can be reapplied to the original color table at a modified step size to include more nodes within the selected error threshold. For instance, if the amount of nodes of the reconstructed difference color table at having an amount of error outside of the selected threshold is too large for a given application, the processes 402, 404, 408 can be repeated on the original difference color table using a smaller step size Δ.

The node or nodes that include an amount of error outside the scope of the selected error threshold are identified at 508 and corrective information is included for the identified nodes at 508. In one example of 412, the corrective information for the nodes of the original difference color table identified at 508 include residual values that can be added to (or subtracted from) the reconstructed nodes to bring the reconstructed node to within the selected error threshold for the node. The corrective information includes the residual values, which can then be losslessly compressed. In some examples, the residual values applied to the reconstructed nodes can bring the final values of the reconstructed nodes to within a second, more stringent error threshold than the error threshold associated with the first set of nodes. In another example, the residual values applied to the reconstructed nodes can bring the final value of the reconstructed nodes to be generally the same as the original nodes. The application of method 500 provides the option to store nodes with significant visual importance that may include perceptible error after lossy compression, such as nodes around the neutral axis, without loss. This improves the performance of the decoded compressed color table.

The compression ratio of the data on the memory device 100 (as compared to the original difference color table) and selected step size Δ are related when nodes exceeding a selected error threshold of color difference are stored without lossy compression at 410. In particular, as the selected step size Δ increases, the compression ratio first increases, reaches a peak value of compression ratio, and then decreases. Not being bound to a particular theory, as the selected step size Δ increases, the compression becomes more aggressive and the amount of error gets larger. As the number of nodes outside the scope of the selected error threshold increases, more nodes are stored without lossy compression or at a lower compression ratio reducing the efficiency of the color table compression. The peak value of the compression ratio for a selected error threshold provides an optimal compression ratio for a selected error threshold of color difference. Additionally, the peak value of compression ratio increases as the error threshold increases.

In one example, a process of first determining an acceptable error threshold in which nodes exceeding the threshold are stored without lossy compression, and then determining the selected step size Δ that corresponds to the peak compression ratio of the relation can be used to select the optimal compression ratio of the lossy compression.

Figure 6:
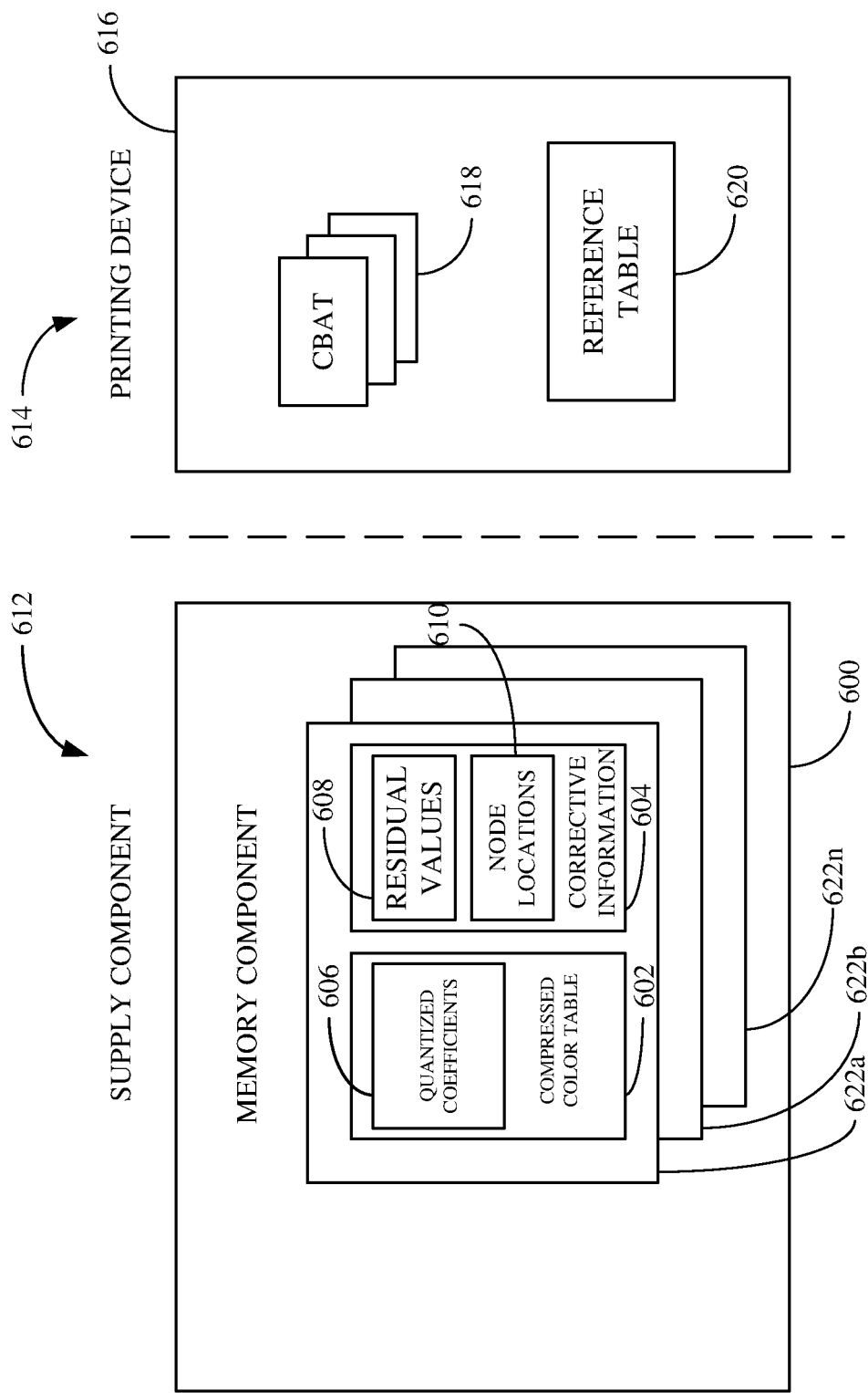
FIG. 6 is a block diagram illustrating an example memory device including a compressed color table of the memory device of FIG. 1 operably coupled to an example printing device.

FIG. 6 illustrates an example memory device 600 including a compressed difference color table 602 and corrective information 604, which can correspond with the compressed difference color table 102 and corrective information 104 of memory device 100. In one example, the compressed difference color table 602 and corrective information 604 can be generated with method 300 and stored on the memory device 600 at 310. In another example, the compressed difference color table 602 and corrective information 604 are reproduced from another memory device that may have information stored at 310.

The compressed difference color table 602 stored on the memory device 600 includes bits representative of quantized coefficients 606 from a lossy compression of difference color table. The quantized coefficients 606 of compressed difference color table 602 can be produced at 306. In one example, the quantized coefficients 606 are stored as a binary file. In another example, the quantized coefficients 606 have been further compressed with a lossless compression. Memory device 600 can include addition information related to decoding the quantized coefficients, such as step size Δ or other information.

The corrective information 604 includes residual values 608 be added to a set of nodes of the initially reconstructed difference table to bring the value of that node within the error threshold. The residual values 608 can be produced at 308. The corrective information 604 can also include node location information 610 for the locations of the set of nodes to be modified with the residual values, such as node location information generated at 308, as to the location of the nodes corresponding with the residual values 608. In one example, the residual values 608 and node location information 610 are stored as a binary file. In another example, the residual values 608 and node location information 610 have been further compressed with a lossless compression.

In one example, the memory device 600 is included on a supply component 612, such as an ink cartridge, a toner cartridge, etc. The supply component can be operably coupled to a printing device 614. The printing device can include a separate memory device 616 that is operably coupled to the memory device 600. In one example, the separate memory device 616 includes a coefficient bit assignment table (CBAT) 618, such a coefficient bit assignment table generated at 306, which can be applied to decode the quantized coefficients 606. The separate memory device 616 can also include a reference table 620 such as the reference table generated at 302. In other examples, one or more of the CBAT 618 and reference table 620 can be instead included on memory device 600.

The compressed difference table 602 and corrective information 604 can correspond with one difference color table 622a of a plurality of difference color tables 622a, 622b, . . . , 622n. In one example, the color table information related to the ink color of the cartridge is included as a difference color table 622a. Other color difference color tables 622b-622n can include a color table for each media type/color separation method (such as K-Only and CMYK Black color separation methods). The plurality of difference color tables 622a-622n can relate to The N difference color tables, and each of the N difference color tables can include a unique set of quantized coefficients, residual values, and node location information. Further, the separate memory device 616 can include a plurality of CBATs that correspond with the quantized coefficients in each of the plurality of difference color tables 622a-622b for each of the colorants.

Figure 7:
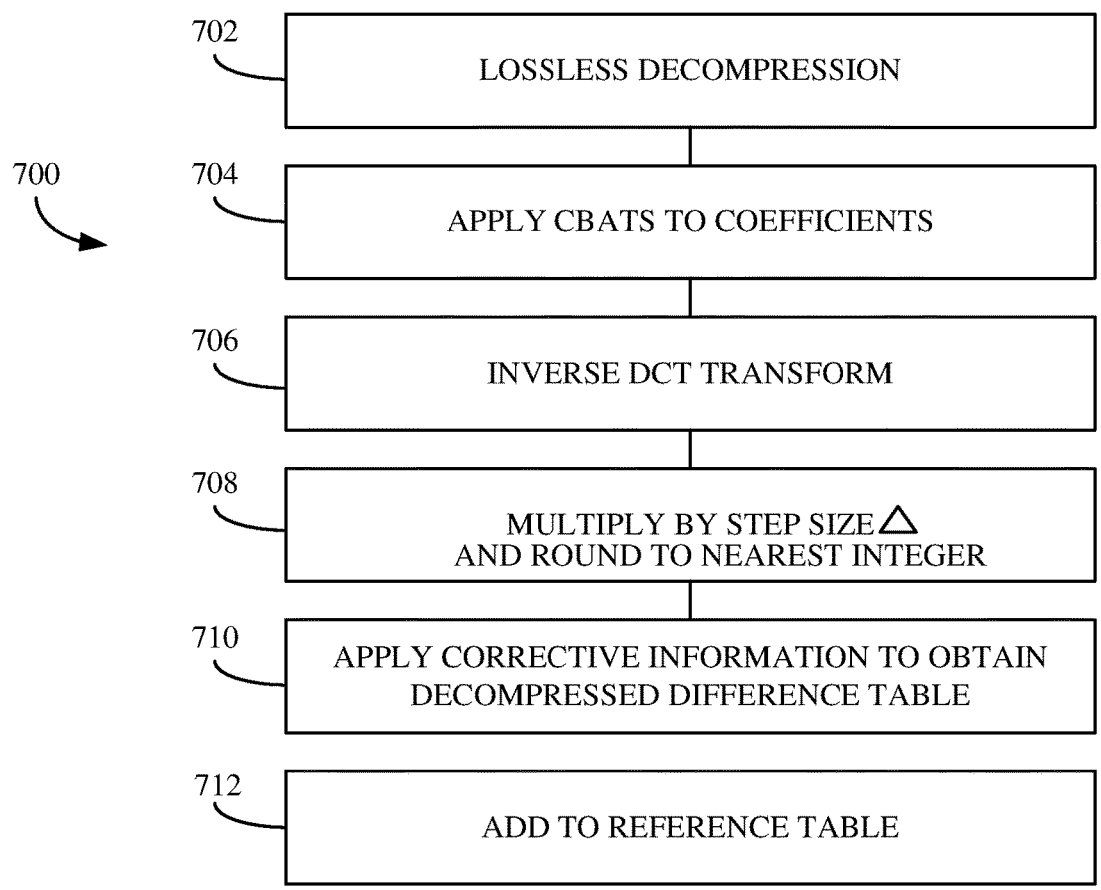
FIG. 7 is a block diagram illustrating an example method of decoding the memory device of FIG. 6.

FIG. 7 illustrates a method 700 of decoding the compressed color difference table 622a of memory device 600. A standard lossless decompression technique, such as inverse LZMA or inverse GZIP (i.e., the inverse of the lossless compression applied at 406), is applied to losslessly compressed difference color table 602 and corrective information 604 at 702 to provide a binary stream including the quantized DCT coefficients 606, and corrective information 604 such as residual values 608 and nodes locations 610. The coefficient bit assignment table (CBAT) 618 can be used to determine how many bits of the binary stream belong to each node location. The coefficient bit assignment tables 618 are applied to the quantized DCT coefficients 606 to reconstruct the DCT coefficients at 704. An inverse DCT transform is applied to the DCT coefficients at 706. The coefficients are multiplied by the quantizer step size Δ and rounded to the nearest integer to obtain the initially reconstructed difference color tables at 708.

The corrective information 604 is applied to the initially reconstructed difference color tables at 710 to obtain the decompressed difference color table. In one example the corrective information 604 includes residual values 608 that can be applied to a set of nodes of the initially reconstructed color table to obtain the decompressed difference color table. For example, the residual value for an identified node location is added to the value of the corresponding node location in the initially reconstructed difference table. This process is repeated for each residue value in the corrective information 604.

The reference table 620 is added to the decompressed difference table from 710 to obtain final reconstructed color table at 712. In one example, the decompressed difference table and reference table 620 each include $M^3$ nodes, and the value of each node of the decompressed difference table is added to the value of the corresponding node in the reference table 620 to provide a value at the corresponding node in the final reconstructed color table. Thus, the value at node location j of the decompressed difference table is added to the value at node location j of the reference table 620 to provide the value at node location j of the final reconstructed color table, in which j is the node location from 1 to $M^3$. The final reconstructed $J_{in}$-dimensional to $J_{out}$-dimensional color tables can be applied to a color management system.

The example, method 700 can be implemented to include a combination of one or more hardware devices and programs for controlling a system, such as printing device having a processor and memory, to perform method 700 to decode the compressed color difference table of memory device 600. For example, method 700 can be implemented as a set of executable instructions stored in a computer memory for controlling the processor to receive the compressed color difference table and reference table and perform method 700.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A print cartridge, comprising:
   a memory device including data to reconstruct a color table for a printing device, the data comprising a compressed bitstream stored in the memory device, wherein the compressed bitstream comprises:
   a plurality of quantized coefficients from a lossy compression of a plurality of difference nodes of a difference color table at a selected step size, wherein a value of each difference node in the difference color table is to be added to a value of a corresponding node of a reference table stored on the printing device; and
   corrective information for a set of nodes to be modified with residual values, wherein the corrective information includes the residual values and node location information for locations of the set of nodes to be modified with the residual values;
   wherein the quantized coefficients and the corrective information included in the bitstream are compressed, and
   the memory device further stores the step size; and
   a reservoir of toner or ink, wherein the reservoir of toner or ink has a color corresponding to the difference color table.

2. The print cartridge of claim 1, wherein the compressed bitstream is compressed with a lossless compression and comprises a data stream of the quantized coefficients derived from a discrete cosine transform (DCT) at the selected step size.

3. The print cartridge of claim 2, wherein the quantized coefficients are based on coefficients derived from application of the DCT at the selected step size on the difference color table.

4. The print cartridge of claim 1, wherein the selected step size indicates a compression amount of the quantized coefficients.

5. The print cartridge of claim 1, wherein the selected step size corresponds to a selected compression ratio of the lossy compression.

6. The print cartridge of claim 1, wherein the bitstream of the quantized coefficients is a one-dimensional bitstream of the quantized coefficients.

7. The print cartridge of claim 1, wherein the reference table is based on a plurality of color lookup tables.

8. The print cartridge of claim 1, wherein the quantized coefficients are useable to produce a reconstructed difference color table based on inverting the lossy compression.

9. The print cartridge of claim 8, wherein the residual values are to be applied to the reconstructed difference color table.

10. The print cartridge of claim 1, wherein the reference table is based on a plurality of color lookup tables.

11. The print cartridge of claim 1, wherein the memory device further comprises a coefficient bit assignment table that includes information related to a number of bits assigned to each of the quantized coefficients.

12. The print cartridge of claim 1, wherein the reservoir is to store black toner or ink, and wherein the difference color table corresponds to the black toner or ink.

13. The print cartridge of claim 1, wherein the quantized coefficients are useable with the reference table to provide a reconstructed color table.

14. The print cartridge of claim 1, wherein each difference node represents a value that is a difference of a value of a node of a color table and a value of a corresponding node of the reference table.

15. The print cartridge of claim 1, wherein the plurality of difference nodes comprise a set of nodes having a color difference outside an error threshold at a selected compression ratio.

* * * * *